United States Patent
Li et al.

(10) Patent No.: US 12,266,881 B2
(45) Date of Patent: Apr. 1, 2025

(54) SAFETY SHIELD ASSEMBLY FOR POWER RECEPTACLE AND RELATED POWER RECEPTACLE

(71) Applicant: Chengli Li, Suzhou (CN)

(72) Inventors: Chengli Li, Suzhou (CN); Xiaoming Zhang, Suzhou (CN)

(73) Assignee: Chengli Li, Suzhou (CN)

( * ) Notice: Subject to any disclaimer, the term of this patent is extended or adjusted under 35 U.S.C. 154(b) by 383 days.

(21) Appl. No.: 18/064,058

(22) Filed: Dec. 9, 2022

(65) Prior Publication Data

US 2024/0195106 A1 Jun. 13, 2024

(30) Foreign Application Priority Data

Nov. 18, 2022 (CN) .......................... 202223070835.3

(51) Int. Cl.
 *H01R 13/453* (2006.01)
(52) U.S. Cl.
 CPC ............................... *H01R 13/4534* (2013.01)
(58) Field of Classification Search
 CPC .................................................. H01R 13/4534
 USPC ........................................................ 439/137
 See application file for complete search history.

(56) References Cited

U.S. PATENT DOCUMENTS

| | | | |
|---|---|---|---|
| 4,722,693 A | 2/1988 | Rose | |
| 5,915,981 A | 6/1999 | Mehta | |
| 6,537,089 B1* | 3/2003 | Montague | H01R 13/4534 439/145 |
| 6,555,771 B2* | 4/2003 | Shao | H01R 13/4534 200/51 R |
| 6,767,229 B1 | 7/2004 | Wang | |
| 6,776,630 B1* | 8/2004 | Huang | H01R 13/4534 439/145 |
| 7,312,963 B1 | 12/2007 | Radosavljevic et al. | |
| 7,452,221 B1* | 11/2008 | Oddsen | H01R 13/4534 439/140 |
| 7,527,508 B1* | 5/2009 | Lee | H01R 13/4534 439/137 |
| 7,551,047 B2 | 6/2009 | Sokolow et al. | |
| 7,637,756 B1* | 12/2009 | Hsu | H01R 13/4534 439/145 |
| 7,868,719 B2* | 1/2011 | Bazayev | H01H 9/0264 200/43.16 |
| 7,914,307 B1* | 3/2011 | Yang | H01R 13/4534 439/145 |

(Continued)

*Primary Examiner* — Harshad C Patel
(74) *Attorney, Agent, or Firm* — Chen Yoshimura LLP

(57) ABSTRACT

A safety shield assembly for a power receptacle includes a frame having openings corresponding to socket holes of the power receptacle, and a sliding block assembly and a resilient member disposed in the frame. The sliding block assembly include a sliding block body with two inclined surfaces, at least one of which having a slot to receive a wear-resistant block. In the initial state, the resilient member urges the sliding block assembly to cover the openings. The frame further includes a position limiting member and a balancing support member. When an inserted object pushes on only one of the two inclined surfaces, the position limiting member limits a sliding motion of the sliding block assembly; when two inserted objects simultaneously push on the two inclined surfaces, the sliding block assembly is balanced on the balancing support member and slides along the frame to expose the openings.

10 Claims, 13 Drawing Sheets

(56) References Cited

U.S. PATENT DOCUMENTS

| | | | |
|---|---|---|---|
| 7,934,935 B1* | 5/2011 | Gao | H01R 13/4534 |
| | | | 439/137 |
| 8,187,012 B1 | 5/2012 | Baldwin et al. | |
| 9,059,529 B1* | 6/2015 | Lai | H01R 13/44 |
| 9,312,625 B2* | 4/2016 | Shen | H01R 13/4534 |
| 9,548,574 B2* | 1/2017 | Hsu | H01R 13/7038 |
| 10,424,863 B1* | 9/2019 | Zhuang | H01R 13/4534 |
| 10,770,823 B1* | 9/2020 | Li | H01R 24/78 |
| 10,804,638 B1* | 10/2020 | Li | H01R 13/4534 |
| 11,329,437 B2* | 5/2022 | Hu | H01R 13/7031 |
| 11,431,122 B2* | 8/2022 | Quan | H01R 24/20 |
| 11,456,555 B1* | 9/2022 | Lin | H01R 13/4534 |
| 2003/0017731 A1* | 1/2003 | Huang | H01R 13/4534 |
| | | | 439/137 |
| 2005/0026482 A1* | 2/2005 | Huang | H01R 13/4536 |
| | | | 439/145 |
| 2016/0013577 A1 | 1/2016 | Diakomis et al. | |
| 2016/0301154 A1* | 10/2016 | Lee | H01R 13/4534 |

\* cited by examiner

SAFETY SHIELD ASSEMBLY FOR POWER RECEPTACLE AND RELATED POWER RECEPTACLE

BACKGROUND OF THE INVENTION

Field of the Invention

This invention generally relates to home appliances, and in particular, it relates to a safety shield assembly for a power receptacle and a power receptacle having such a safety shield assembly.

Description of Related Art

Power receptacles are widely used in homes and public places. In most receptacles, the socket holes are exposed. If a metal piece or other conductive object is inserted into the socket holes, such as by a child or even by an adult due to inadvertent operation, electrical shocks may result, causing personal harm or property damage. Some current power receptables have safety shields or shutters, but they often have complex structures and are difficult to assemble. Thus, they are often unsuitable for automated production and assembly, resulting in high cost and low production efficiency.

Some current receptables have a safety shield assembly with a simpler structure, which includes a frame, and a sliding block and a resilient member disposed in the frame. When the resilient member is in its initial state, it urges the sliding block to a closed position where the sliding block covers the socket holes of the receptacle. The sliding block includes two inclined surfaces; when an inserted object pushes on only one of the two inclined surfaces, the position limiting member limits a sliding motion of the sliding block, but when two inserted objects (e.g. two prongs of a power plug) simultaneously push on the two inclined surfaces, the sliding block is balanced on a balancing support member and slides along the frame to expose the socket openings. However, when the safety shield assembly is used for a long period of time, the repeated insertion of the power plug can cause wear of its components, impacting the normal operation of the safety shield assembly, causing difficulty for inserting power plugs. This affects the user experience and reduces the life of the power receptacle.

SUMMARY

To solve the above problems, embodiments of the present invention provide a safety shield assembly for a power receptacle which, by providing a wear-resistant block on a sliding block body, improves the wear resistance of the sliding block assembly, reduces wear of the sliding block assembly caused by inserting the power plug, prolongs the life of the safety shield assembly. The safety shield assembly is safe, low cost and suitable for automated assembly.

In one aspect, embodiments of the present invention provide a safety shield assembly, which includes: a frame having a bottom panel with at least two openings corresponding to at least two socket holes of the power receptacle; a sliding block assembly disposed in the frame, including a sliding block body and a wear-resistant block, wherein the sliding block body includes two inclined surfaces, at least one of the two inclined surfaces has a slot located at a position where an object inserted through a socket hole of the power receptable pushes against, the wear-resistant block being disposed in the slot; and a resilient member disposed in the frame, wherein when the resilient member is in its initial state, it urges the sliding block assembly to a closed position where the sliding block assembly covers the at least two openings; wherein the frame further includes a position limiting member configured to abut the sliding block body, and a balancing support member, wherein when an inserted object pushes on only one of the two inclined surfaces, the position limiting member limits a sliding motion of the sliding block assembly, and wherein when two inserted objects simultaneously push on the two inclined surfaces, the sliding block assembly is balanced on the balancing support member and slides along the frame to expose the at least two openings.

Based on the above technical characteristics, the present invention may include any one or more of the embodiments below.

In some embodiments, the two inclined surfaces of the sliding block body have different heights, wherein the slot is provided on the inclined surface having a larger height.

In some embodiments, the wear-resistant block extends over an entire range of travel of an inserted object.

In some embodiments, the wear-resistant block is retained in the slot by friction fit.

In some embodiments, the wear-resistant block is formed of a ceramic material, or stainless steel, or iron.

In some embodiments, a shape of the wear-resistant block matches a shape of the slot, and a top surface of the wear-resistant block is flush with a top surface of the inclined surface that has the slot.

In some embodiments, the slot is located at a location where an inserted object initially contacts the inclined surface.

In some embodiments, the openings of the frame includes an I shaped opening and a T shaped opening, and wherein one of the two inclined surfaces that corresponds to the T shaped opening has the slot, and another one of the two inclined surfaces that corresponds to the I shaped opening has no slot.

In another aspect, the present invention provides a power receptacle, which includes: at least one safety shield assembly according to any one of the above embodiments; a body, including an upper cover and a base connected together, the upper cover including the at least two socket holes; and at least two plug receiving plates disposed in the body below the at least two socket holes, respectively, wherein the safety shield assembly is disposed between the upper cover and the at least two plug receiving plates, and wherein the at least two openings of the frame of the safety shield assembly correspond in position to the at least two socket holes of the upper cover of the body.

In some embodiments, the body further includes a second position limiting protrusion, and wherein the sliding block body includes a second position limiting face configured to abut the second position limiting protrusion.

The safety shield assembly according to embodiments of the present invention have a simple structure, is safe and reliable, easy to use, and suitable for a variety of models of power receptacles. Its simple structure is suitable for mass production and assembly and improves installation efficiency, reduces cost and has wide application. By using a wear-resistant block on an inclined surface, the safety shield assembly is more wear-resistant, which improves user experience and extends product life.

BRIEF DESCRIPTION OF THE DRAWINGS

Preferred embodiments of the present invention are described with reference to the drawings. In these drawings, like reference symbols represent like features.

DETAILED DESCRIPTION OF PREFERRED EMBODIMENTS

A power receptacle according to preferred embodiments of the present is described below. It should be understood that these descriptions describe embodiments of the present invention but do not limit the scope of the invention. When describing the various components, directional terms such as "up," "down," "left," "right," "top," "bottom" etc. are not absolute but are relative. These terms may correspond to the views in the various illustrations, and can change when the views or the relative positions of the components change.

Figure 1A:
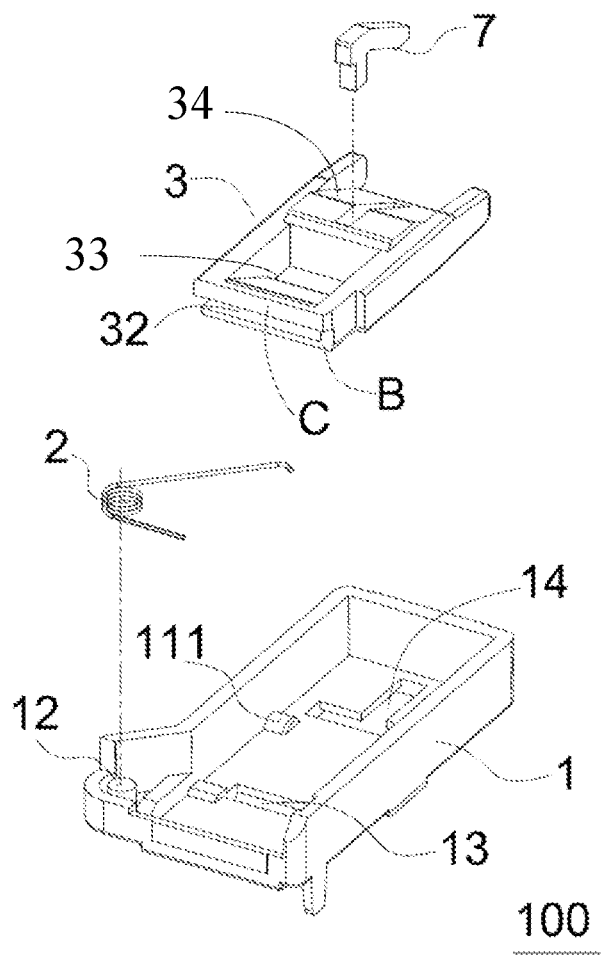
FIG. 1A is an exploded view of a safety shield assembly for a power receptacle according to an embodiment of the present invention.
Figure 1B:
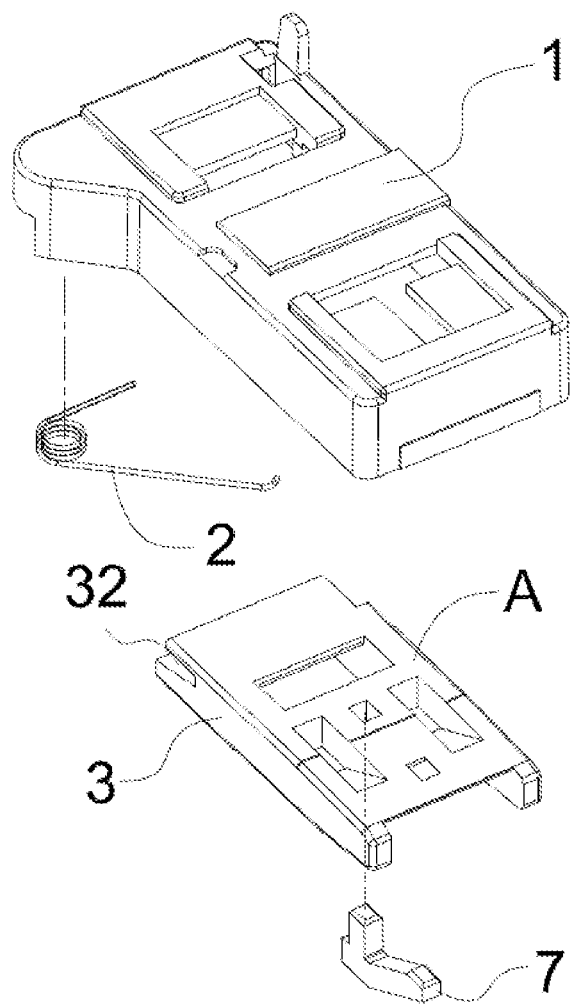
FIG. 1B is another exploded view of the safety shield assembly of FIG. 1A from another viewing angle.
Figure 1C:
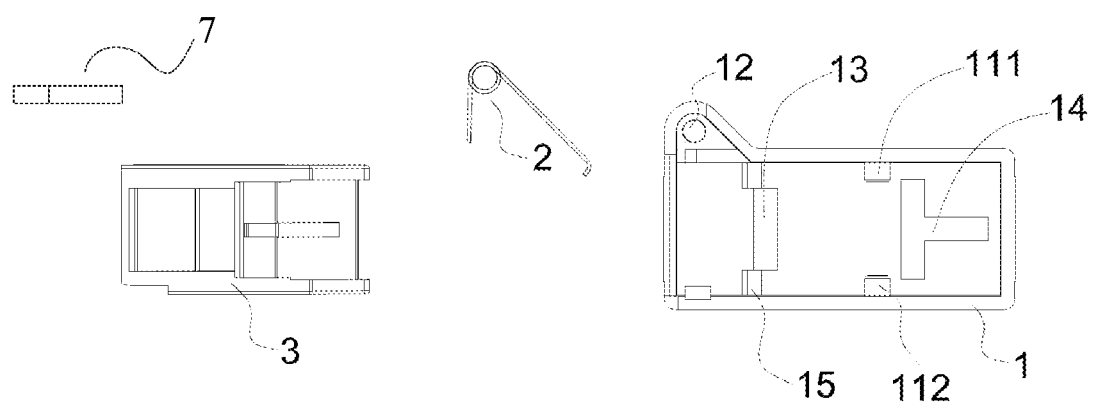
FIG. 1C is another exploded view of the safety shield assembly of FIG. 1A from yet another viewing angle.

FIGS. 1A to 1C illustrate a safety shield assembly 100 for a power receptacle according to an embodiment of the present invention. The safety shield assembly 100 includes a frame 1, a sliding block assembly 3 disposed within the frame, and a resilient member 2 disposed within the frame 1. The sliding block assembly includes a sliding block body (also designated by reference symbol 3) and a wear-resistant block 7.

The frame 1 has a bottom panel and a side wall, and is preferably open at the top. The bottom panel has multiple openings corresponding to the shape of the socket holes of the receptacle, such as I shaped openings or T shaped openings. For example, FIG. 1A illustrates an I shaped opening 13 and a T shaped opening 14, which are suitable for various standard power receptacles. The frame 1 further includes a position limiting member and a balancing support member that can abut the sliding block assembly 3.

The sliding block body 3 has two inclined surfaces 33 and 34 facing upwards. At least one of the inclined surfaces has a slot that receives the wear-resistant block 7, the slot being located at a position of the inclined surface where an inserted object (e.g. a prong of a plug) will push against. In some embodiments, only the inclined surface 33 has a slot that receives the wear-resistant block 7; in other embodiments, only the inclined surface 34 has a slot that receives a wear-resistant block; in yet other embodiments, each of inclined surfaces 33 and 34 has a slot that receives a wear-resistant block. For example, in FIGS. 1A-1C, only the inclined surface 34 has a slot 35, at a position where an inserted object will push against, that receives the wear-resistant block 7. Preferably, the slot 35 is at a location of the inclined surface where the inserted object contacts first. When the inserted object pushes against the inclined surface 34, the inserted object first pushes against the wear-resistant block 7, so that the wear of the sliding block body 3 is minimized.

Preferably, the resilient member 2 is configured such that in its initial condition, it urges the sliding block assembly 3 toward a closed position where the sliding block assembly covers the openings 13, 14. The resilient member 2 may be a compression spring, tension spring, resilient plate, or torsion spring, etc. A torsion spring is shown in the illustrated embodiment.

The working principles of the safety shield assembly 100 are as follows. When an object is attempted to be inserted but is only pushing on one of the two inclined surfaces 33 and 34, due to the effect of the balancing support member, the sliding block assembly becomes tilted and the position limiting member prevents the sliding block assembly from sliding. When an object (e.g. a power plug with two prongs) is attempted to be inserted by pushing simultaneously on both inclined surfaces, due to the effect of the balancing support member, the sliding block assembly remains untilted and is able to slide along the frame 1 to expose the openings. In this connection, note that an opening is provided near the lower end of the inclined surface 33 to allow the prong to pass through, and the sliding block assembly ends at the lower end of the inclined surface 34 which allows the other prong to pass through. This way, the safety shield assembly can effectively prevent an object from being inserted into only one socket hole or prevent the plug prongs from being incorrectly inserted. Moreover, in the protecting state (i.e., when the sliding block assembly covers the openings), the safety shield assembly can isolate components inside the power receptacle from the environment, thereby protecting them from undesirable environmental factors (such as dust, moisture, etc.).

In some embodiments, the two inclined surfaces of the sliding block body 3 have the same size. In some other embodiments, the two inclined surfaces may be designed to have different sizes (but the same inclination angle), so the two inserted prongs have different amount of travel along the inclined surfaces. For example, the inclined surface 33 has a smaller a size to suit the I shaped opening 13, while the inclined surface 34 has a larger size to suit the T shaped opening 14. This allows the safety shield assembly to be used with power receptacles of different standard models, such as ANSI/NEMA WD6 standard models. Further, in the illustrated embodiment, the inclined surface 34 that correspond to the T shaped opening is provided with a slot to receive the wear-resistant block 7, while the inclined surface 33 that correspond to the I shaped opening is not provided with a slot, so that while the wear-resistant block 7 can reduce wear of the inclined surface 34, the manufacturing process is simplified and material cost and production cost can be reduced.

Preferably, the two inclined surfaces of the sliding block body 3 have different heights, and the one with larger height is provided with the slot to receive the wear-resistant block 7. Because the higher one is pushed by a prong first when two prongs of a plug are simultaneously inserted into the two socket holes, providing a wear-resistant block 7 on this inclined surface can effectively reduce wear. Further, compared to providing two wear-resistant blocks on both inclined surfaces, providing only one wear-resistant block on the higher inclined surface can simplify manufacturing process and reduce material cost and production cost.

In some embodiment, the shape of the wear-resistant block 7 matches the shape of the slot 35, and the top surface of the wear-resistant block 7 is flush with the top surface of the corresponding inclined surface. Thus, the wear-resistant block 7 can improve wear resistance of the sliding block assembly without impeding the normal insertion of the prongs. In some embodiments, the wear-resistant block 7 extends over the entire range of travel of the inserted prong, i.e., from the position where the prong initially contacts the inclined surface, to the position where the sliding block assembly moves completely out of the way of the openings below it, the prong only contacts the wear-resistant block 7 without contacting the sliding block body 3. This maximally reduces the wear during insertion. In some other embodiments, the wear-resistant block 7 extends only a part of the range of travel near where the prong initially contacts the inclined surface, rather than the entire range of travel. This reduces the wear at the location where the prong first contacts the inclined surface, while saving material and manufacturing cost for the wear-resistant block.

In some embodiments, the wear-resistant block 7 is retained in the slot 35 by friction fit. In some embodiments, the sliding block body 3 is formed of an electrically insulating plastic material, and the wear-resistant block 7 is formed of a hard, wear-resistant material. The wear-resistant block 7 is inserted into the slot 35 by friction fit to retain it in the slot. The wear-resistant block 7 may be formed of a ceramic or a metal material such as stainless steel, iron, etc. Ceramic materials are preferred, which can further improve the electrical insulating property and safety of the safety shield assembly 100. Note that friction fit is not required; the wear-resistant block 7 may be simply placed inside the slot 35, without being retained in the stop by friction.

Figure 3A:
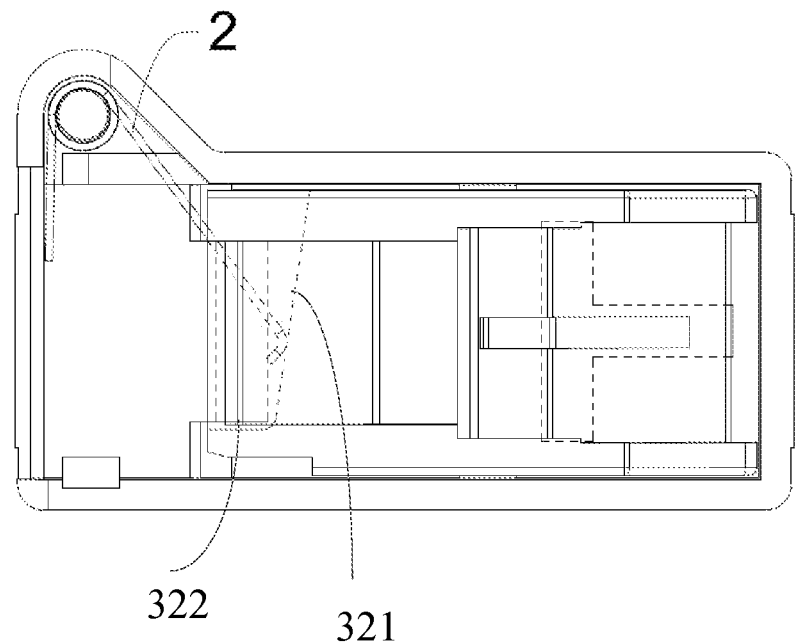
FIG. 3A is a plan view of the safety shield assembly in a closed state.
Figure 3B:
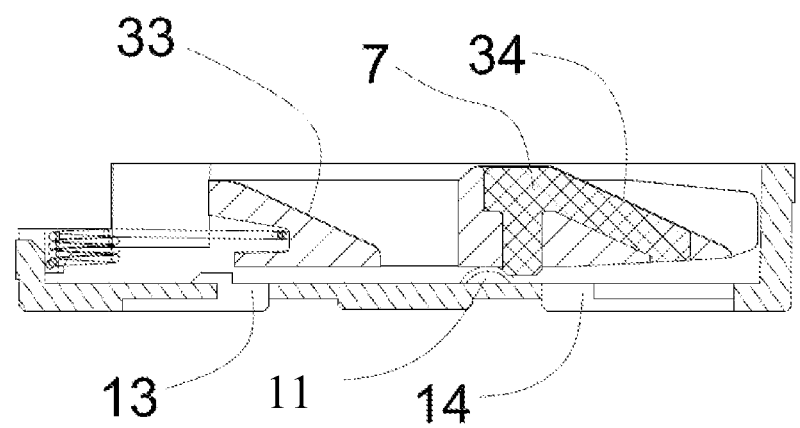
FIG. 3B is a cross-sectional view of the safety shield assembly shown in FIG. 3A.
Figure 4A:
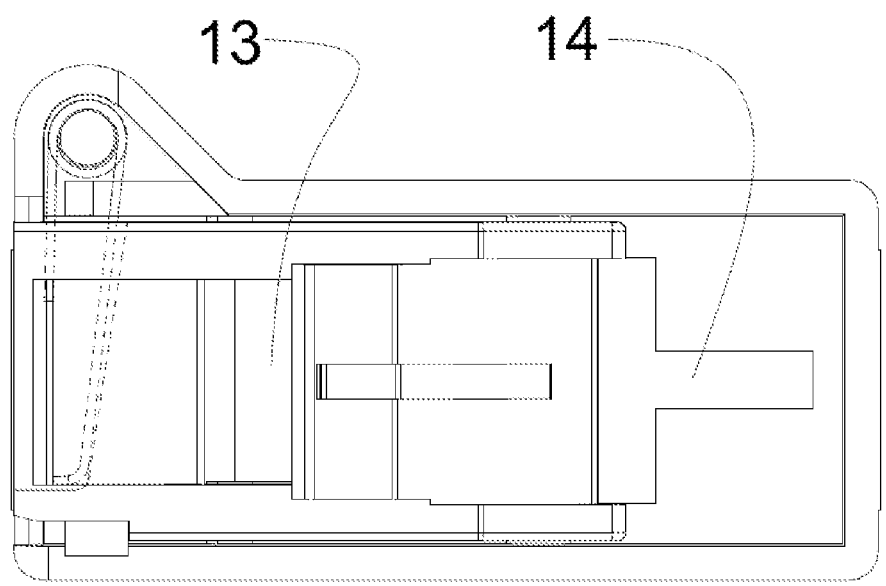
FIG. 4A is a plan view of the safety shield assembly in an open state.
Figure 4B:
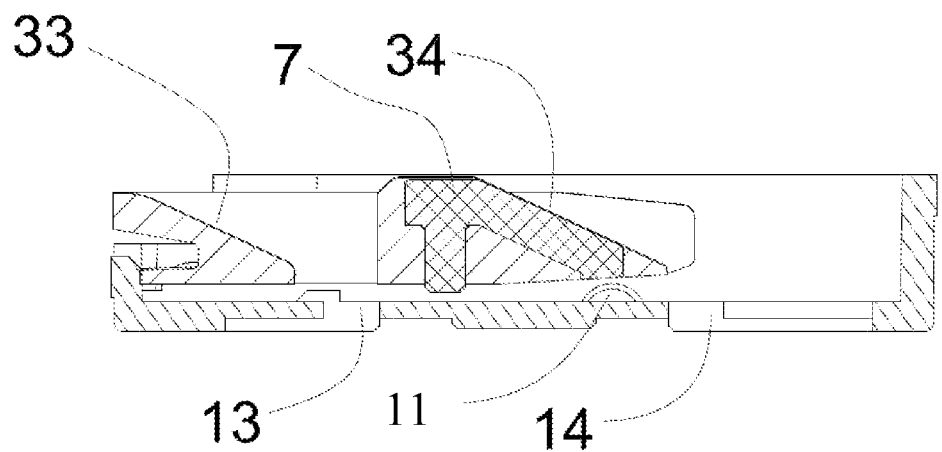
FIG. 4B is a cross-sectional view of the safety shield assembly shown in FIG. 4A.

In some embodiments, the balancing support member is an elongated bump 11 having a curved surface that protrudes from the inner bottom surface of the frame 1 (see FIGS. 3B and 4B). The bump 11 is elongated in the direction perpendicular to the sliding direction of the sliding block assembly 3. Preferably, the balancing support member is located between the two openings of the frame, and when the sliding block assembly 3 is in the closed position (under the urging of the resilient member 2), the balancing support member is located approximately at the center of the bottom surface of the sliding block assembly 3. Thus, the bump 11 can balance the sliding block assembly 3 on it and allow the sliding block assembly to pivot with respect to the frame as well as to slide along the frame. It can also reduce friction, thereby prolonging product life. It should be understood that the bump 11 may also be configured as a ridge, or a series of protruding dots that are spaced apart in the direction perpendicular to the sliding direction of the sliding block assembly, or even a single relatively large protruding dot.

In the illustrate embodiment (see FIGS. 1A and 1C), the balancing support member includes a pair of bumps 111, 112 disposed symmetrically on the bottom surface of the frame 1 and spaced apart from each other in the direction perpendicular to the sliding direction of the sliding block assembly.

Figure 2:
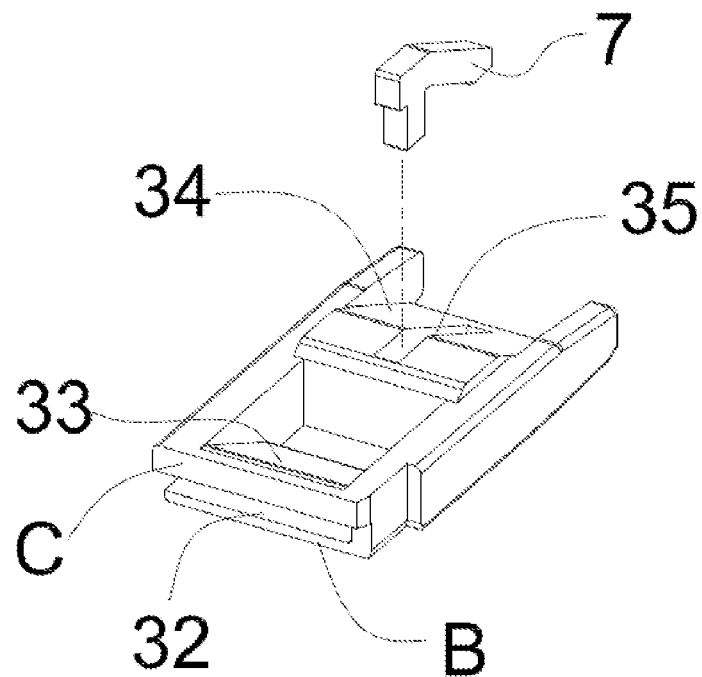
FIG. 2 illustrates a sliding block of the safety shield assembly of FIGS. 1A-1C.

As shown in FIG. 1C, the position limiting member of the frame 1 includes a protruding block 15 that protrudes from the inner bottom surface of the frame 1. The protruding block may be a protruding cube, ridge or dot. Advantageously, the protruding block 15 is disposed near at least one of the openings in the bottom of the frame. Alternatively, the protruding block 15 may protrude from the side wall of the frame 1. As shown in FIG. 2, the sliding block body 3 has a bottom surface A that faces, and is approximately parallel to, the inner bottom surface of the frame 1. The sliding block body 3 has a first position limiting face B that is configured to abut the protruding block 15. To achieve the goal of limiting the position of the sliding block body 3, the power receptacle is provided with a second position limiting protrusion 41, as shown in FIGS. 5B to 7B. Note that the second position limiting protrusion 41 may alternatively be provided on the frame 1 itself, such as a sideways protrusion from the sidewall of the frame 1. Advantageously, the second position limiting protrusion 41 is disposed near at least one of the openings. Correspondingly, the sliding block body 3 has a second position limiting face C that is configured to abut the second position limiting protrusion 41.

Referring to FIGS. 1A to 4B, one end of the resilient member 2 abuts the sliding block body 3, and the other end of it abuts a corresponding structure of the frame 1, such as the inner side surface of the frame 1. The frame 1 also has a retaining member for retaining the resilient member 2, such as a protruding shaft that protrudes from the inner bottom surface or the inner side surface of the frame, or a receding slot on the inner bottom surface or the inner side surface of the frame. In the example of FIGS. 1A and 1C, a shaft 12 that protrudes from the inner bottom surface of the frame 1 serves as the retaining member. To simplify the structure and reduce the space occupied in the power receptacle, the sliding block 3 is provided with a groove 32 to accommodate one end of the resilient member 2. The groove 32 also facilitates the positioning and assembling of the sliding block and the resilient member. In some embodiment, the groove 32 has a working surface 321 that drives the deformation of the resilient member 2, and a locking surface 322 that keeps the resilient member 2 in the deformed state. More specifically, referring to FIGS. 3A and 3B, when the resilient member 2 is in its initial state, i.e., when the sliding block assembly 3 covers the openings in the frame (and the socket holes of the power receptacle), if two prongs of a plug are normally inserted, the end of the resilient member 2 that abuts the sliding block 3 becomes deformed as the sliding block 3 slides, and its position moves along the working surface 321 until it reaches the locking surface 322. At this time, the openings (and the socket holes) become exposed, so the prongs can be successfully inserted, as shown in FIGS. 4A and 4B.

The operation of the safety shield assembly is described below with reference to FIGS. 5A to 7B.

The power receptacle is shown to include a body and plug receiving plates 51 and 52 disposed in the body. The body includes an upper cover 4 and a base 6 connected together. The safety shield assembly is disposed between the upper cover 4 and the plug receiving plates 51 and 52.

When no object is being inserted into the power receptacle, in the safety shield assembly, due to the action of the resilient member 2, the sliding block assembly 3 is maintained in a motionless condition and does not tilt relative to the frame, and the safety shield assembly is in a closed state.

Figure 5A:
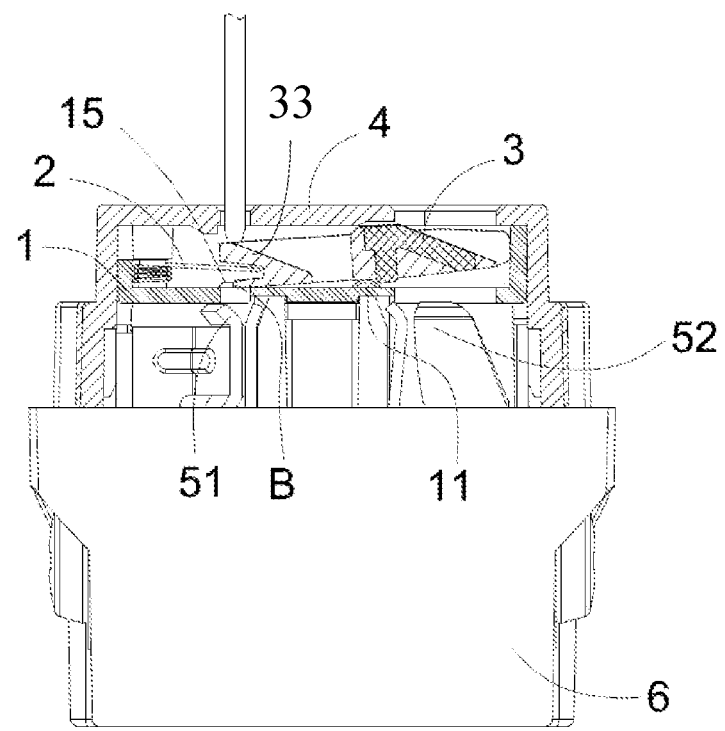
FIG. 5A is a cross-sectional view of a power receptacle equipped with the safety shield assembly in a protecting state, showing a foreign object being inserted in only one of the socket holes.
Figure 5B:
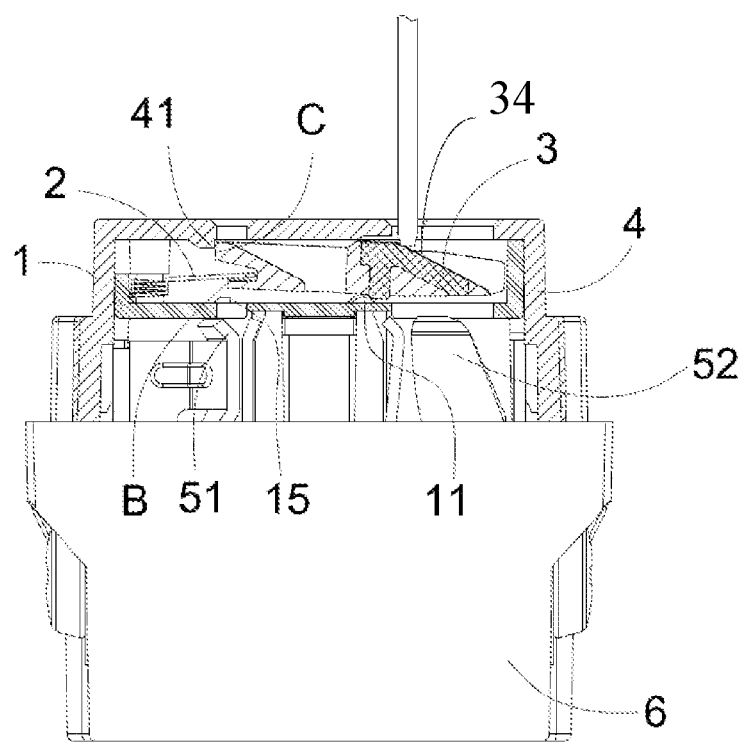
FIG. 5B is another cross-sectional view of the power receptacle equipped with the safety shield assembly in the protecting state, showing a foreign object being inserted only in another one of the socket holes.
Figure 6A:
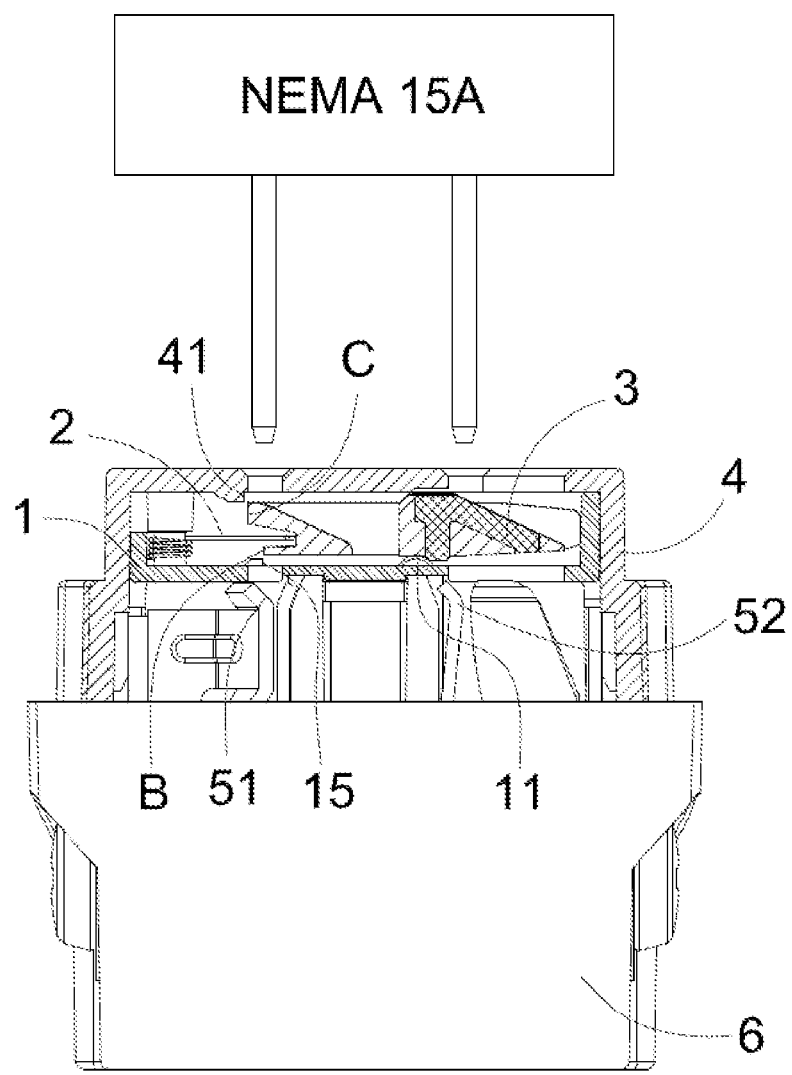
FIG. 6A is a cross-sectional view of the power receptacle equipped with the safety shield assembly in a normal working state, where the prongs of an NEMA 15 A plug are ready to be inserted into the power receptacle.
Figure 6B:
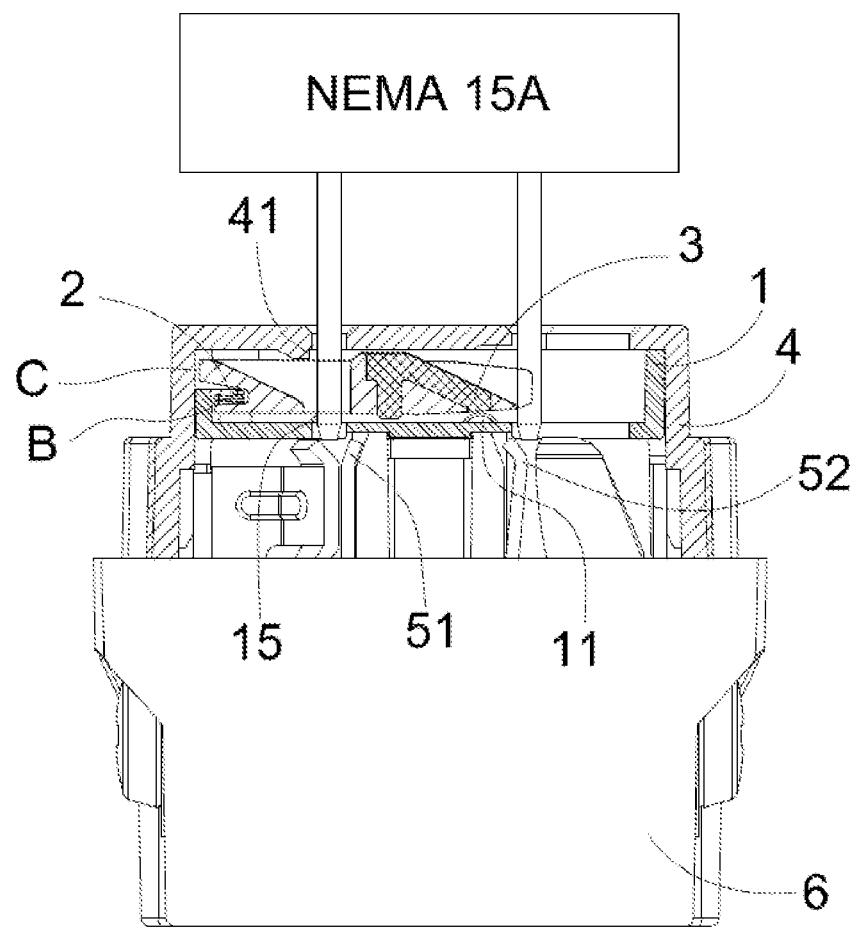
FIG. 6B is a cross-sectional view of the power receptacle equipped with the safety shield assembly in the normal working state, where the prongs of the NEMA 15 A plug are normally inserted into the power receptacle.

When an object is attempted to be inserted into only one of the socket holes of the power receptacle, for example into the hole on the left hand side as shown in FIG. 5A, the object contacts the inclined surface 33 of the sliding block assembly 3 and exerts a downward force on the inclined surface 33. Due to the presence of the bump 11, the right hand side of the sliding block assembly 3 will be tilted upwards and the left hand side is tilted downwards, and the first position limiting face B on the left hand side of the sliding block assembly 3 will be pushed against the protruding block 15 of the frame 1. This limits the sliding motion of the sliding block 3, so as to prevent the object from being further inserted. Similarly, when an object is attempted to be inserted into only the socket hole on the right hand side as shown in FIG. 5B, the object exerts a downward force on the inclined surface 34 of the sliding block assembly 3. Thus, the left hand side of the sliding block assembly 3 will be tilted upwards, and the second position limiting face C of the sliding block 3 will be pushed against the second position limiting protrusion 41 on the body of the power receptacle. This again limits the sliding motion of the sliding block assembly 3, so as to prevent the object from being further inserted. This way, the safety shield assembly protects against insertion by an object into a single hole of the power receptacle.

Figure 7A:
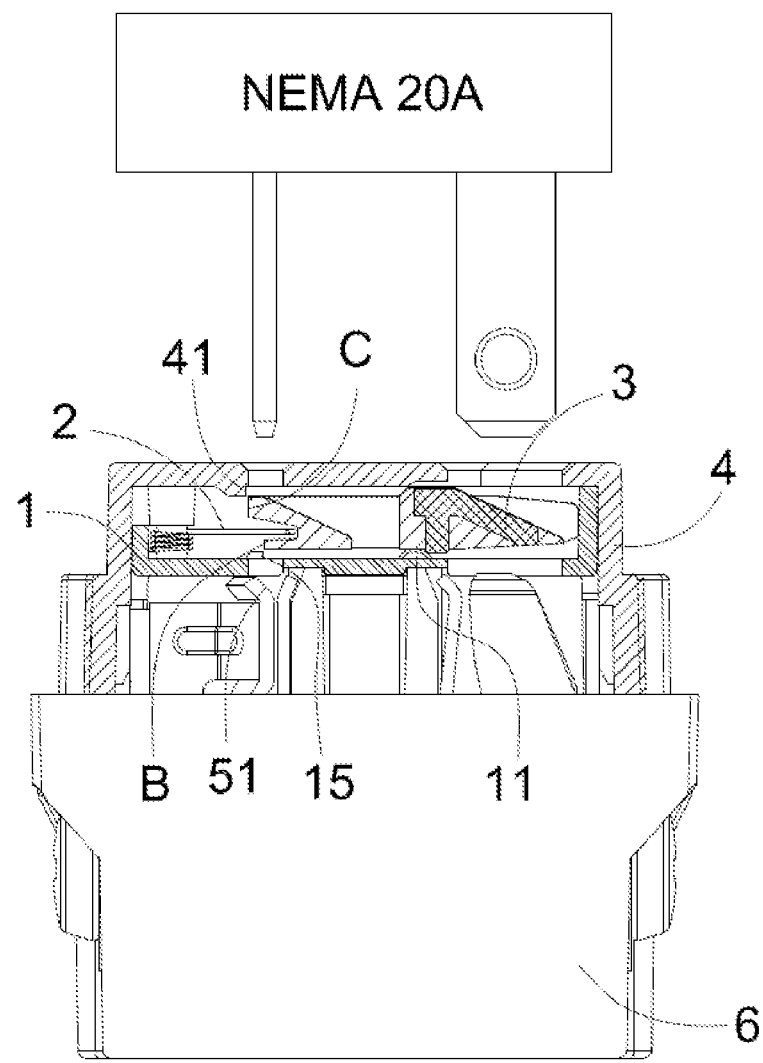
FIG. 7A is a cross-sectional view of the power receptacle equipped with the safety shield assembly in a normal working state, where the prongs of an NEMA 20 A plug are ready to be inserted into the power receptacle.
Figure 7B:
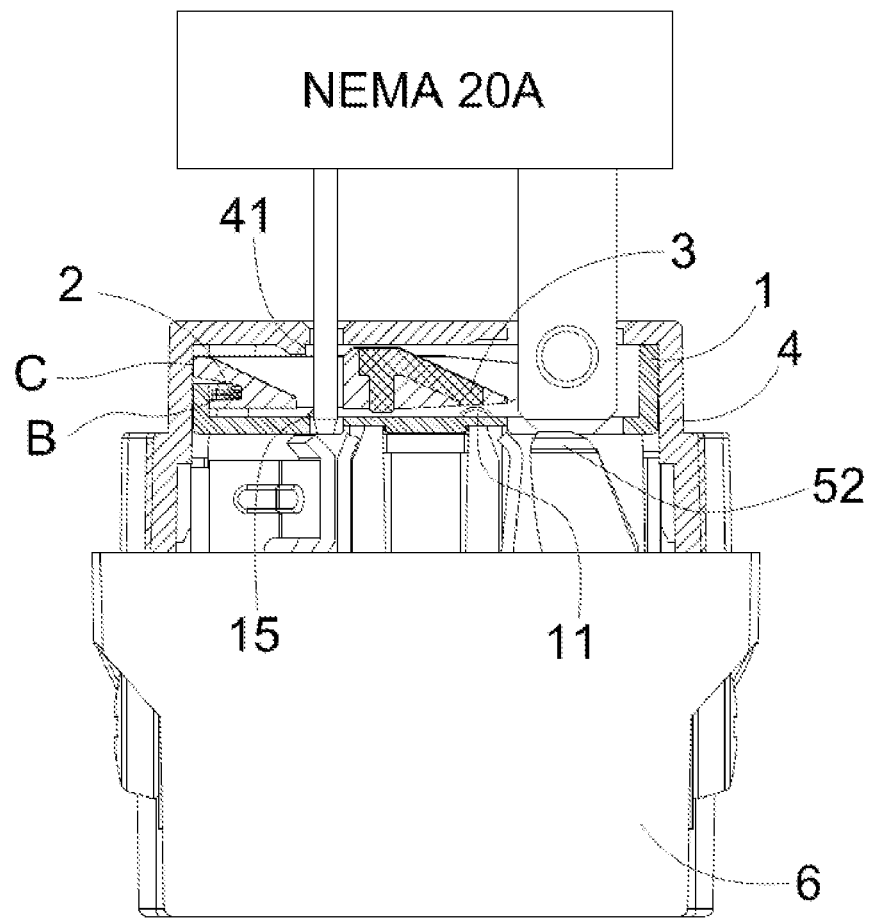
FIG. 7B is a cross-sectional view of the power receptacle equipped with the safety shield assembly in the normal working state, where the prongs of the NEMA 20 A plug are normally inserted into the power receptacle.

As mentioned earlier, the safety shield assembly according to embodiments of the present invention is suitable for various power receptacles complying with the ANSI/NEMA WD6 standard, such as 1-15P, 5-15P, 5-20P, 6-15P, 6-20P, etc. When a plug complying with the standard, for example, an NEMA 15 A plug shown in FIGS. 6A and 6B, or an NEMA 20 A plug shown in FIGS. 7A and 7B, is attempted to be inserted, with the two prongs of the plug simultaneously inserted into the two holes of the upper cover 4, due to the balancing effect of the bump 11, the sliding block assembly 3 will not tilt with respect to the frame 1. Thus, the downward force exerted on the two inclined surfaces of the sliding block assembly 3 causes the sliding block assembly 3 to slide along the frame 1 against the spring force of the resilient member 2, thereby exposing the openings below to allow the prongs to be properly inserted. The inserted prongs contact the plug receiving plates 51 and 52 to establish electrical connection. It should be noted that when the plug is removed from the power receptacle, due to the spring force of the resilient member 2, the sliding block assembly 3 will slide back to its closed position and will continue to perform the protection function.

Figure 8A:
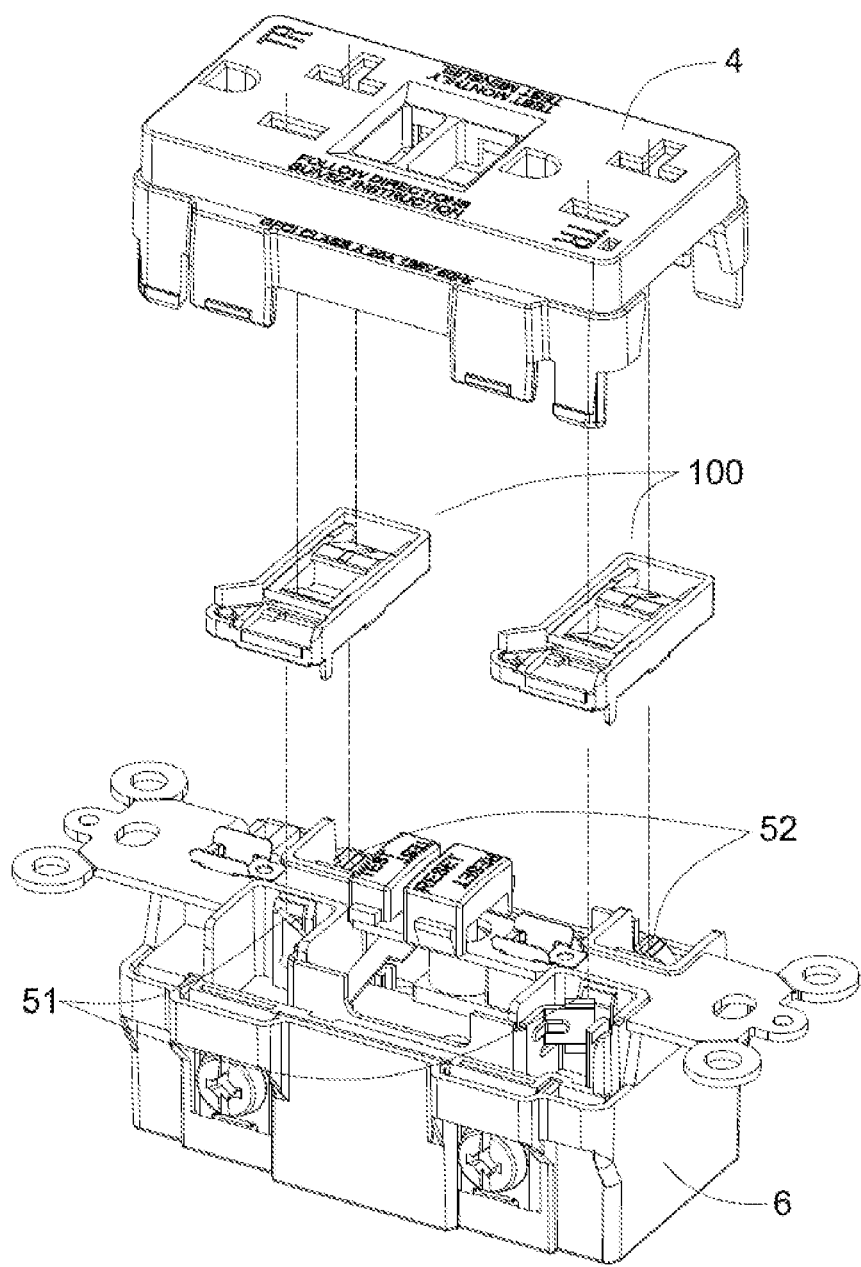
FIG. 8A is an exploded view of a power receptacle incorporating a safety shield assembly according to an embodiment of the present invention.
Figure 8B:
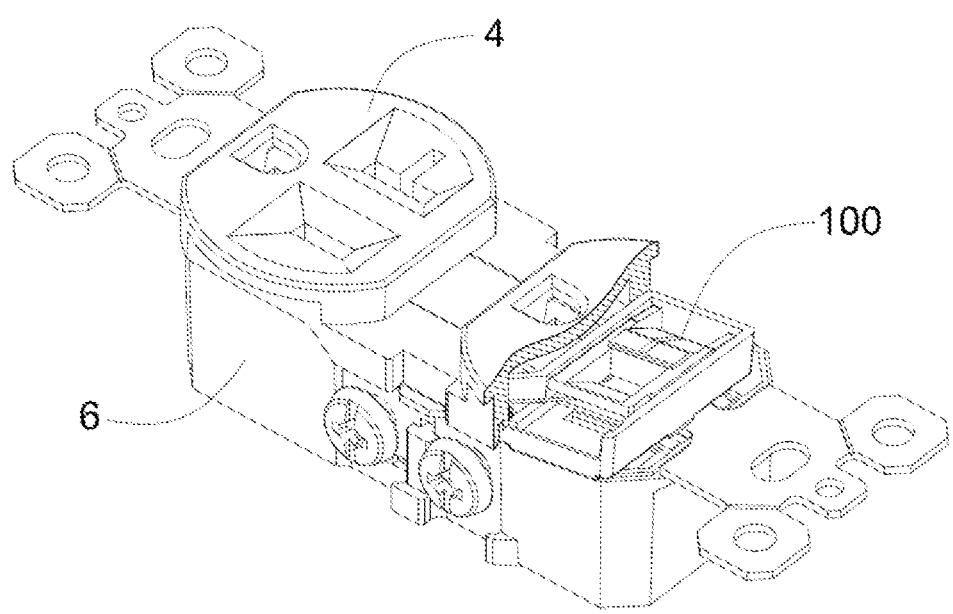
FIG. 8B is a partial cut-away view of a power receptacle incorporating a safety shield assembly according to another embodiment of the present invention.
Figure 8C:
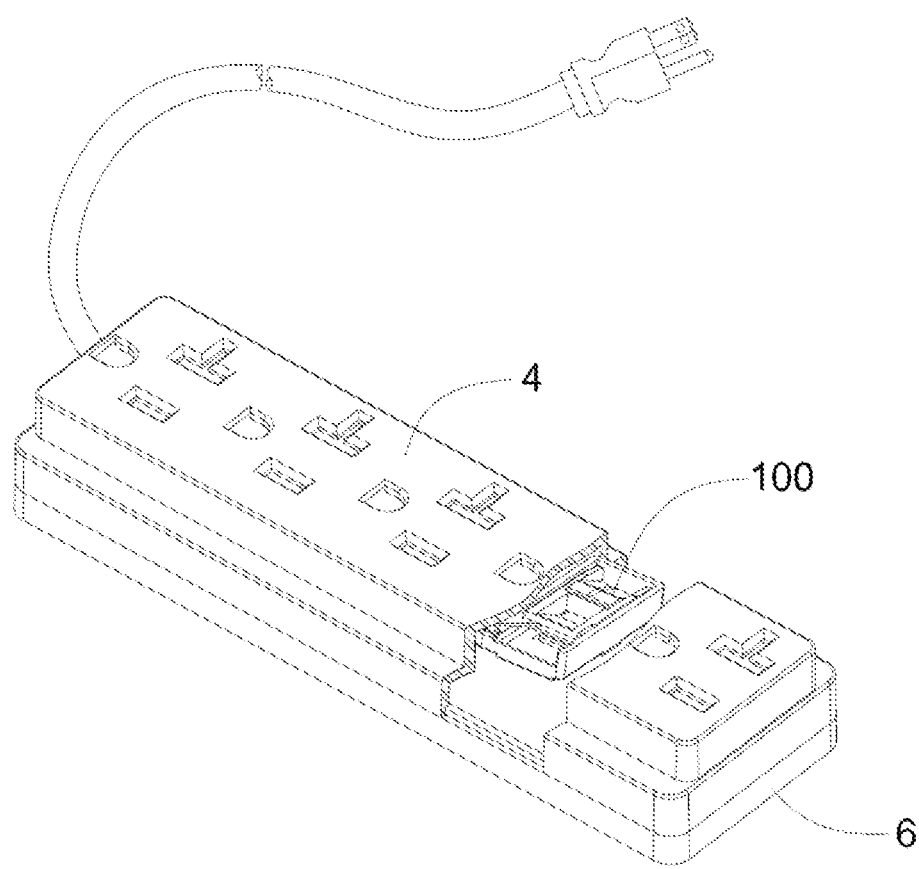
FIG. 8C is a partial cut-away view of a power receptacle incorporating a safety shield assembly according to yet another embodiment of the present invention.

FIGS. 8A to 8C illustrate the structures of a number of power receptacles that incorporate the safety shield assembly according to embodiments of the present invention. The power receptacle shown in FIG. 8A is similar to those shown in FIGS. 6A-7B, and includes two safety shield assemblies 100. As seen in FIGS. 8B and 8C, the shape of the socket holes for the positive and negative lines and ground line may be modified based on practical need, and the power receptacle may be either a wall mounted receptacle or a power strip, but the structure of the safety shield assembly 100 does not need to be changed. Further, because the safety shield assembly has a compact and simple structure, the overall size of the power receptacle does not significantly increase when the safety shield assembly is incorporated. Thus, the safety shield assembly can have wide applicability. Moreover, because the safety shield assembly has relatively few components, and the various components can limit the position of each other, the assembling process is easy to automate.

It should be appreciated that the embodiments in FIGS. 1A to 8C only show some possible shapes, sizes and spatial arrangements of the components of the safety shield assembly and power receptacle of the present invention. These illustrations are not limiting. Other shapes, sizes and spatial arrangements may be used without departing from the spirit of the present invention. Further, the frame and sliding block of the above described safety shield assembly are respectively shown as integral pieces, which is convenient for processing and assembly; however, they may also be separate pieces or partly integrated and partly separate, depending on the number of the socket holes.

While the present invention is described above using specific examples, these examples are only illustrative and do not limit the scope of the invention. It will be apparent to those skilled in the art that various modifications, additions and deletions can be made to the safety shield assembly device of the present invention without departing from the spirit or scope of the invention.

What is claimed is:

1. A safety shield assembly for a power receptacle, comprising:
    a frame having a bottom panel with at least two openings corresponding to at least two socket holes of the power receptacle;
    a sliding block assembly disposed in the frame, including a sliding block body and a wear-resistant block, wherein the sliding block body includes two inclined surfaces, at least one of the two inclined surfaces has a slot located at a position where an object inserted through a socket hole of the power receptable pushes against, the wear-resistant block being disposed in the slot; and
    a resilient member disposed in the frame, wherein when the resilient member is in its initial state, it urges the sliding block assembly to a closed position where the sliding block assembly covers the at least two openings;
    wherein the frame further includes a position limiting member configured to abut the sliding block body, and a balancing support member, wherein when an inserted object pushes on only one of the two inclined surfaces, the position limiting member limits a sliding motion of the sliding block assembly, and wherein when two inserted objects simultaneously push on the two inclined surfaces, the sliding block assembly is balanced on the balancing support member and slides along the frame to expose the at least two openings.

2. The safety shield assembly of claim 1, wherein the two inclined surfaces of the sliding block body have different heights, wherein the slot is provided on the inclined surface having a larger height.

3. The safety shield assembly of claim 1, wherein the wear-resistant block extends over an entire range of travel of an inserted object.

4. The safety shield assembly of claim 1, wherein the wear-resistant block is retained in the slot by friction fit.

5. The safety shield assembly of claim 1, wherein the wear-resistant block is formed of a ceramic material, or stainless steel, or iron.

6. The safety shield assembly of claim 1, wherein a shape of the wear-resistant block matches a shape of the slot, and a top surface of the wear-resistant block is flush with a top surface of the inclined surface that has the slot.

7. The safety shield assembly of claim 1, wherein the slot is located at a location where an inserted object initially contacts the inclined surface.

8. The safety shield assembly of claim 1, wherein the openings of the frame includes an I shaped opening and a T shaped opening, and wherein one of the two inclined surfaces that corresponds to the T shaped opening has the slot, and another one of the two inclined surfaces that corresponds to the I shaped opening has no slot.

9. A power receptacle, comprising:
at least one safety shield assembly of claim 1;
a body, including an upper cover and a base connected together, the upper cover including the at least two socket holes; and
at least two plug receiving plates disposed in the body below the at least two socket holes, respectively,
wherein the safety shield assembly is disposed between the upper cover and the at least two plug receiving plates, and wherein the at least two openings of the frame of the safety shield assembly correspond in position to the at least two socket holes of the upper cover of the body.

10. The power receptacle of claim 9, wherein the body further includes a second position limiting protrusion, and wherein the sliding block body includes a second position limiting face configured to abut the second position limiting protrusion.

\* \* \* \* \*